US007844277B2

(12) United States Patent
Cheng et al.

(10) Patent No.: US 7,844,277 B2
(45) Date of Patent: *Nov. 30, 2010

(54) METHOD FOR COORDINATED CONTROL OF RADIO RESOURCES IN A DISTRIBUTED WIRELESS SYSTEM

(75) Inventors: Fang-Chen Cheng, Randolph, NJ (US); Shupeng Li, Edison, NJ (US); Lei Song, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 359 days.

This patent is subject to a terminal disclaimer.

(21) Appl. No.: 11/386,065

(22) Filed: Mar. 21, 2006

(65) Prior Publication Data

US 2007/0225003 A1 Sep. 27, 2007

(51) Int. Cl.
*H04Q 7/20* (2006.01)
(52) U.S. Cl. .............. 455/450; 455/560; 455/352; 455/436; 370/310; 370/312; 370/335; 370/466
(58) Field of Classification Search .......... 455/450, 455/560, 33.1, 56.1; 370/328, 352, 310, 370/312, 335, 466
See application file for complete search history.

(56) References Cited

U.S. PATENT DOCUMENTS

| 5,507,006 | A * | 4/1996 | Knight ............... 455/422.1 |
| 7,130,640 | B2 * | 10/2006 | Agin .................. 455/453 |
| 7,397,790 | B2 * | 7/2008 | Zeira et al. ............ 370/352 |
| 2003/0050073 | A1 | 3/2003 | Wasko | |
| 2003/0165161 | A1 * | 9/2003 | Kalliokulju et al. ..... 370/466 |
| 2004/0127259 | A1 * | 7/2004 | Matsunaga ............ 455/560 |
| 2004/0170179 | A1 | 9/2004 | Johansson | |
| 2004/0209633 | A1 | 10/2004 | Briancon | |
| 2005/0083876 | A1 * | 4/2005 | Vialen et al. ........... 370/328 |
| 2006/0062193 | A1 * | 3/2006 | Choi et al. ............. 370/342 |
| 2006/0120310 | A1 * | 6/2006 | Zuniga et al. ........... 370/310 |
| 2007/0291674 | A1 * | 12/2007 | Cheng et al. ........... 370/312 |

FOREIGN PATENT DOCUMENTS

| WO | WO 97/25673 A1 | 1/1997 |
| WO | WO 2005/029785 A1 | 3/2005 |

OTHER PUBLICATIONS

R2-051732: "Handover principles in LTE Siemens" *3GPP TSG RAN WG2 LTE ad-hoc*, Sophia-Antipolis, France, Jun. 20-21, 2005.
R2-052875: "Intra-radio access mobility, Make-Before-Break Handover in LTE_ACTIVE" Nokia *3GPP TSG RAN WGs Meeting on LTE*, Seoul, Korea, Nov. 7-11, 2005.

(Continued)

*Primary Examiner*—Charles N Appiah
*Assistant Examiner*—Michael T Vu
(74) *Attorney, Agent, or Firm*—Williams, Morgan & Amerson

(57) ABSTRACT

A method is provided for coordinating distributed radio resource management. The method comprises communicating information between a plurality of units having radio resource management responsibilities, wherein the communicated information is related to radio resources associated with each unit.

8 Claims, 4 Drawing Sheets

OTHER PUBLICATIONS

R2-060078: "Handover procedure for LTE_ACTIVE UE's Samsung" *3 GPP TSG-RAN WG2 #50 Meeting*, Sophia-Antipolis, France, Jan. 9-13, 2006.

R2-060094: "Inter-RAT handover procedures for LTE ACTIVE", NTT DoCoMo, Inc. *3GPP TSG RAN WG2 #50*, Sophia-Antipolis, France, Jan. 9-13, 2006.

R2-060096: "RRC Connected Mobility, Handover with RRC Duplicate in LTE", Huawei *3GPP TSG-RAN WGs Meeting on LTE*, Sophia-Antipolis, France, Jan. 9-13, 2006.

R2-060601: "R3-060085, Cc RAN2). LS on RRM for LTE" *TSG-RANG WG2 meeting #51*, Denver, USA, Feb. 13-17, 2006.

R2-060743: "(R1-060719, Cc RAN2). Reply LS (to R3-060085) on RRM for LTE" *TSG-RAN WG2 meeting #51*, Denver, CO, USA, Feb. 13-17, 2006.

R1-060711: "Text Proposal for TR25.814, Section 9.1.2.7 Ericsson" *TSG-RAN WG1 #44*, Denver, CO, USA, Feb. 13-17, 2006.

R1-060712: "Text Proposal for TR 25.814, Section 7.1.2.6, Ericsson" *TSG-RAN WG1 #44*, Denver, CO, USA, Feb. 13-17, 2006.

International Search Report and Written Opinion mailed Aug. 10, 2007.

* cited by examiner

US 7,844,277 B2

METHOD FOR COORDINATED CONTROL OF RADIO RESOURCES IN A DISTRIBUTED WIRELESS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a typical system 100, as shown in FIG. 1, is a hierarchical architecture and includes a plurality of base stations 130 (e.g., Node Bs) distributed within an area to be serviced by the system. Various Access Terminals 120 (ATs, also known as User Equipment (UE), mobile devices, and the like) within the area may then access the system and, thus, other interconnected telecommunications systems, such as a publicly switched telephone system (PSTN) 160 and a Data network 125, via one or more of the base stations 130. Typically, an AT 120 maintains communications with the system 100 as it passes through an area by communicating with one and then another base station 130, as the AT 120 moves. The AT 120 may communicate with the closest base station 130, the base station 130 with the strongest signal, the base station 130 with a capacity sufficient to accept communications, etc. The base stations 130, in turn, communicate with a Radio Network Controller (RNC) 138, which communicates with a Packet Data Serving Node (PDSN) 164 in a core network 165. Each RNC 138 and PDSN 164 is capable of supporting a plurality of base stations 130. Thus, as an AT 120 moves and communicates with different base stations 130, it may also communicate with different RNCs 138 and PDSNs 164.

The wireless link between the ATs 120 and the Base Stations 120 is typically referred to as the radio link, and in systems such as the Universal Mobile Telephone System (UMTS), much of the coordination of the radio link is handled by the RNCs 138 in a relatively centralized manner. For example, hand-offs of the ATs 120 from one base station 130 to another is determined by the RNCs 138. Similarly, owing to their proximity to one another, the base stations 120 can generate signals that interfere with one another. In some applications, the RNCs 138 control the transmissions of the various base stations 130 to reduce or minimize this type of interference.

However, the industry intends for UMTS to evolve away from the use of RNCs 138 with a distributed Radio Resource Management (RRM) architecture. The complexity of hand-offs and interference mitigation increases in the distributed RRM architecture, as the RRM functions are located at different physical locations.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the instant invention, a method is provided for coordinating distributed radio resource management. The method comprises communicating information between a plurality of units having radio resource management responsibilities, wherein the communicated information is related to radio resources associated with each unit.

BRIEF DESCRIPTION OF THE DRAWINGS

The invention may be understood by reference to the following description taken in conjunction with the accompanying drawings, in which like reference numerals identify like elements, and in which.

Figure 1:
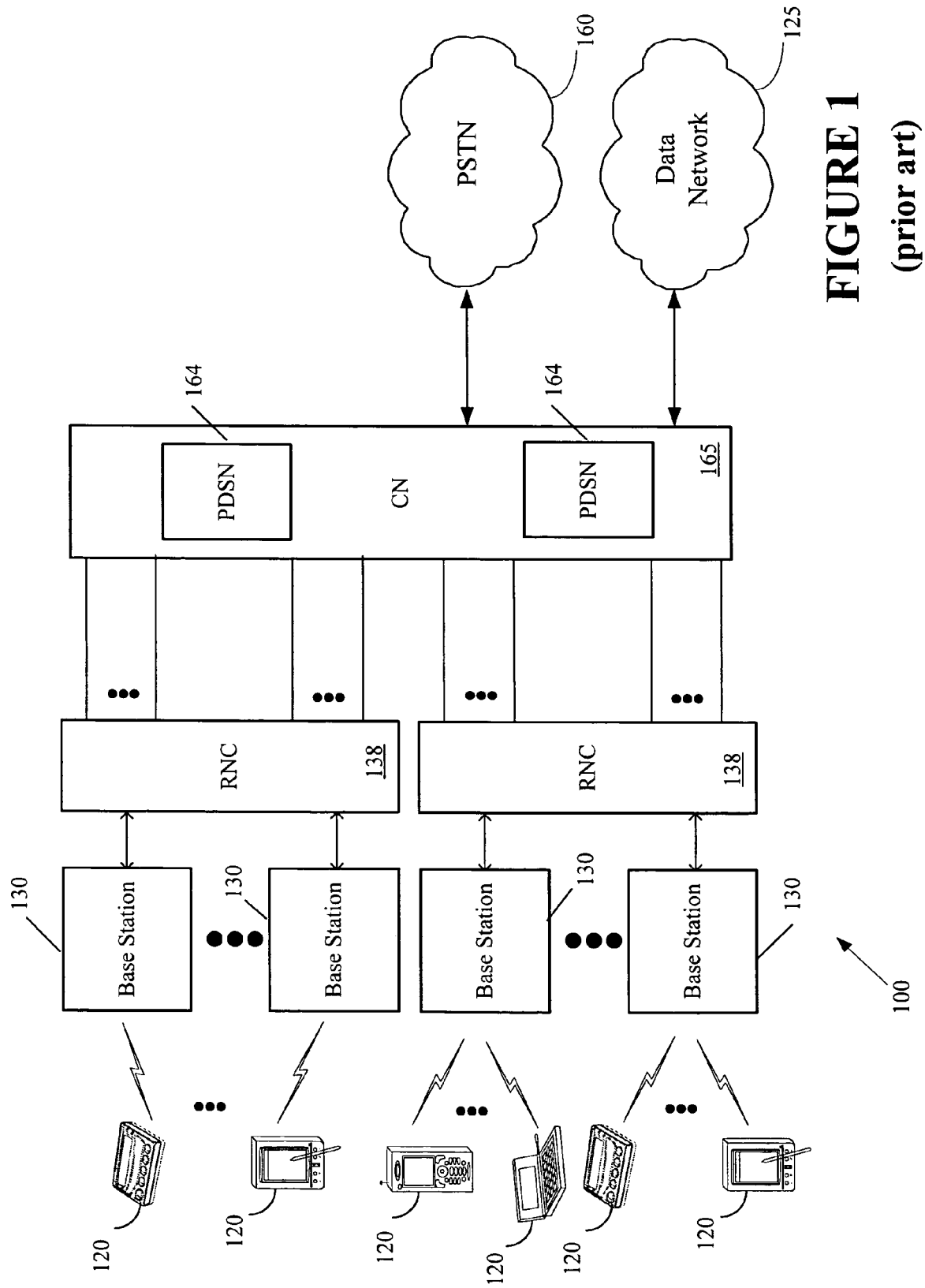
FIG. 1 is a block diagram of a prior art communications system, such as a Universal Mobile Telephone System (UMTS) in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2A:
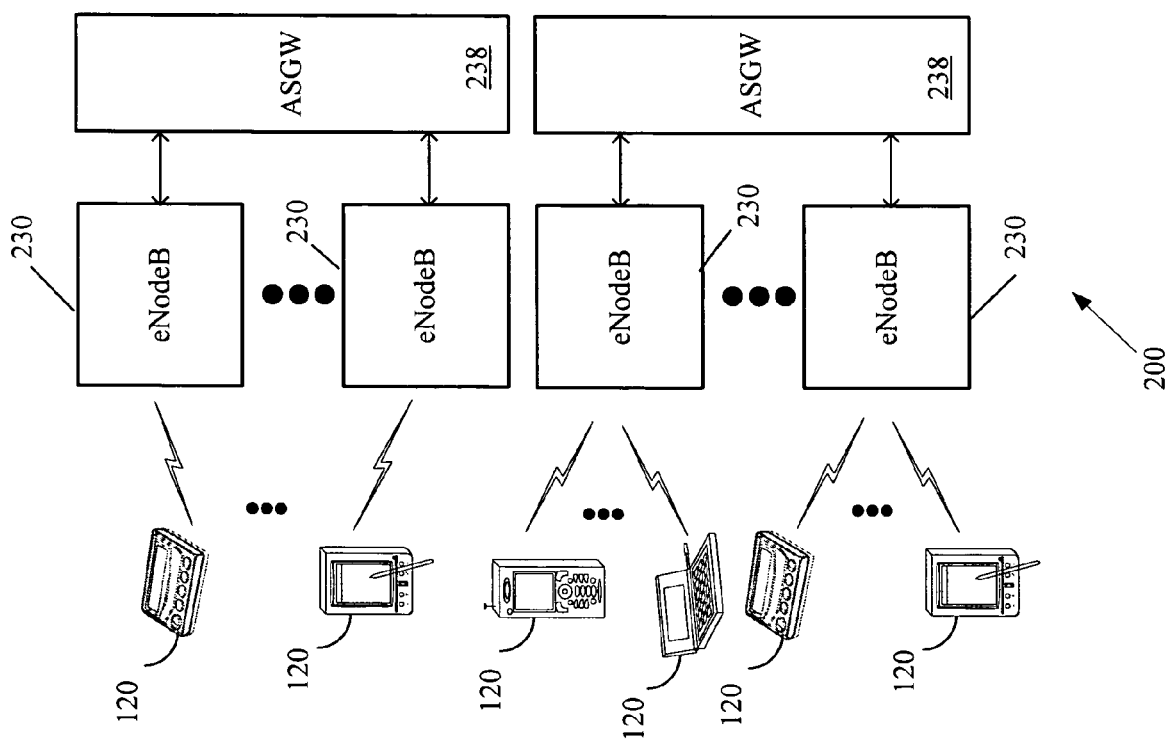
FIGS. 2A and 2B are block diagrams of a portion of a communications system, such as a Long Term Evolution (LTE) UMTS in which the present invention may find application.

Turning now to the drawings, and specifically referring to FIG. 2A, a communications system 200 is illustrated, in accordance with one embodiment of the present invention. For illustrative purposes, the communications system 200 of FIG. 2 is a Universal Mobile Telephone System (UMTS) Long Term Evolution (LTE), although it should be understood that the present invention may be applicable to other systems that support data and/or voice communication. The UMTS LTE system 200 has some similarities to the UMTS system 100 of FIG. 1, but differs substantially with respect to the operation of the instant invention with regard to the base stations 130 and RNCs 138. The communications system 200 allows one or more ATs 120 to communicate with one or more enhanced Node Bs (eNodeB) 230. A plurality of the eNodeBs 230 are coupled to an Access Gateway (ASGW) 238. The ASGW 238 is then responsible for communications with the PSTN 160 and/or Data Network 125 (see FIG. 1). Functionally, the communications system 200 differs from the communications system 100 from at least the standpoint of radio resource management RRM. In the communications system 100, the RRM was primarily effected by the RNC 138. In the communications system 200; however, the RRM functionality has been distributed to the eNodeBs 230.

Thus, it should be appreciated that a coordinated RRM scheme for the communications system 200 may be useful in at least two instances. First, to reduce interference caused by transmissions of adjacent or nearby eNodeBs 230, and second, during hand-offs of the ATs 120 from one eNodeB 230 to another.

A coordinated RRM scheme defines the mechanism for joint radio resource management and performance optimization among cells when the RRM functions are distributed and minimal signaling delay is required in the LTE. The coordinated RRM scheme enables coordination among different RRM functions to perform the handover procedure and interference coordination technology at the same time in the distributed RRM structure.

Multi-cell RRM decisions, such as load-based handover and interference coordination reconfiguration during handover are useful features in the UMTS LTE architecture. Making RRM decisions based on multiples cells would benefit the overall resource allocation and system performance. However, it is often beneficial to avoid the potential competing RRM decisions when multiple cells are considered. The potential issue of the competing RRM points could be avoided by coordinating the RRM decision among the RRM functions, which is one of the objectives in the proposed coordinated RRM scheme.

In one embodiment of the instant invention, the coordinated RRM scheme defines the inter-RRM communication protocol, radio resource elements and functions for joint management, and the decision function for joint radio resource management. The defined functions in the coordinated RRM scheme would allow the system to perform the resource management jointly in a cluster and to avoid or at least substantially reduce any competing decision among RRM functions. The coordinated RRM schemes perform coordination of possibly multi-vendor RRM in a cluster without specifying the actual RRM algorithm running at each distributed node.

One function of the coordinated RRM scheme involves establishing a protocol for inter-RRM communication. The RRM functions in the hierarchical network structure are usually in a centralized location (e.g., RNC) with distributed sub-functions in the distributed nodes (e.g., Power management in HSDPA in the base station) in UMTS. The inter-RRM communication is a client-server, one-to-one communication between the base station and the RNC. The majority of the RRM functions are located in the RNC. However, since the majority of the RRM functions envisioned in UMTS LTE are located at the eNodeB 230, the inter-RRM communication may be a distributed protocol design with multiple capabilities. The inter-RRM communication protocol in the UMTS LTE may support peer-to-peer, one-to-many, and broadcast communication.

The peer-to-peer communication allows inter-RRM communications that involve direct negotiation between two eNodeBs 230 in a cluster without going through a centralized node (RRM server or RNC). The peer-to-peer communication capability would reduce the process delay and jointly optimize the system resource control. A typical example of peer-to-peer RRM communication is the handover between two eNodeBs 230. The direct RRM communication between two eNodeBs 230 would expedite the handover process and reduce the potential performance degradation during handover.

The one-to-many communications capability enables the eNodeB 230 to have inter-RRM negotiation with many other nodes at the same time. The one-to-many RRM communication may be used to minimize the probability of competing decisions among the nodes with relationship to a radio resource management. A typical example of one-to-many RRM communication is the resource allocation for the user mobility. The initial trigger of the handover request would involve multiple eNodeBs 230 and the ACGW 238. The one-to-many inter-RRM communication would allow the serving eNodeB 230 to trigger the handover request directly to all nodes involved at the same time.

The broadcast communications capability enables the eNodeB 230 to broadcast a request of the reconfiguration parameters to other RRM functions in the cluster at the same time. The broadcast capability allows the RRM to trigger a request immediately to other RRMs in the cluster for any configuration change. The typical example of broadcast capability in the inter-RRM communication protocol is the reconfiguration of the interference mitigation scheme when one RRM detects an abnormal condition or severe degradations of the on-going interference mitigation scheme.

The inter-RRM communication may specify the entities required for the joint radio resource optimization. The RRM entities may be pre-configured or request on demand between RRM without specifying the exact RRM algorithm in each node. The radio resource entities could be the frequency chunk, interference level, cell load, radio bearer, measurement, etc. The radio resource entities are defined to assist the RRM function to manage its own resource with radio information from other cells.

The decision function is an algorithm to independently calculate the values or statistics based on the received RRM entities for the decision making of the radio resource configuration and control. The decision function may be independent of the RRM algorithm for inter-vendor RRM communication. The decision function may be specified to trigger the radio resource reconfiguration or reallocation. A general example of the decision function is the threshold function for the handover. The decision function could be specified with the threshold value of triggering the handover being sent between the eNodeBs 230 during the handover process.

Once the inter-RRM communication protocol, the Radio resource entities and decision functions are specified clearly, the RRM function of each individual node may be developed independently based on the inter-cell RRM coordination. This will optimize the overall radio resource utilization.

The coordinated RRM scheme is useful to provide the inter-RRM communication for coordinating distributed RRM functions to support the interference mitigation technology during the handover in LTE. The RRM functions for the interference mitigation technology are located at the eNodeB 230 and require the coordination of the radio resource in static, semi-static, or dynamic fashion among the cells in the UMTS LTE to mitigate the interference level for the cell edge users. The interference mitigation may be reconfigured when the system load is changing dynamically or in situations with load imbalances. The system load is changing dynamically when handovers take place. The interference mitigation is also sensitive to the dynamics of the cell edge load. The RRM functions that handle the interference mitigation technology may communicate with other cells' RRM or RRM server to reconfigure the interference mitigation parameters without explicitly specifying the RRM and interference coordination algorithms in the eNodeB 230. During the handover period, the RRM for the mobility management and the handover procedure handling is performed and its location is at the central node or handshaking between the serving and target base stations. The defined inter-RRM communication protocol, radio resource entities, and decision functions in the coordinated RRM scheme enable interaction among distributed RRM functions to perform the interference coordination algorithm and handover procedure at the same time. The coordinated RRM scheme enables the interference mitigation scheme to trigger the redistribution of the radio resources among cells when the handover procedure takes place and results in unbalanced system loads.

Figure 2B:
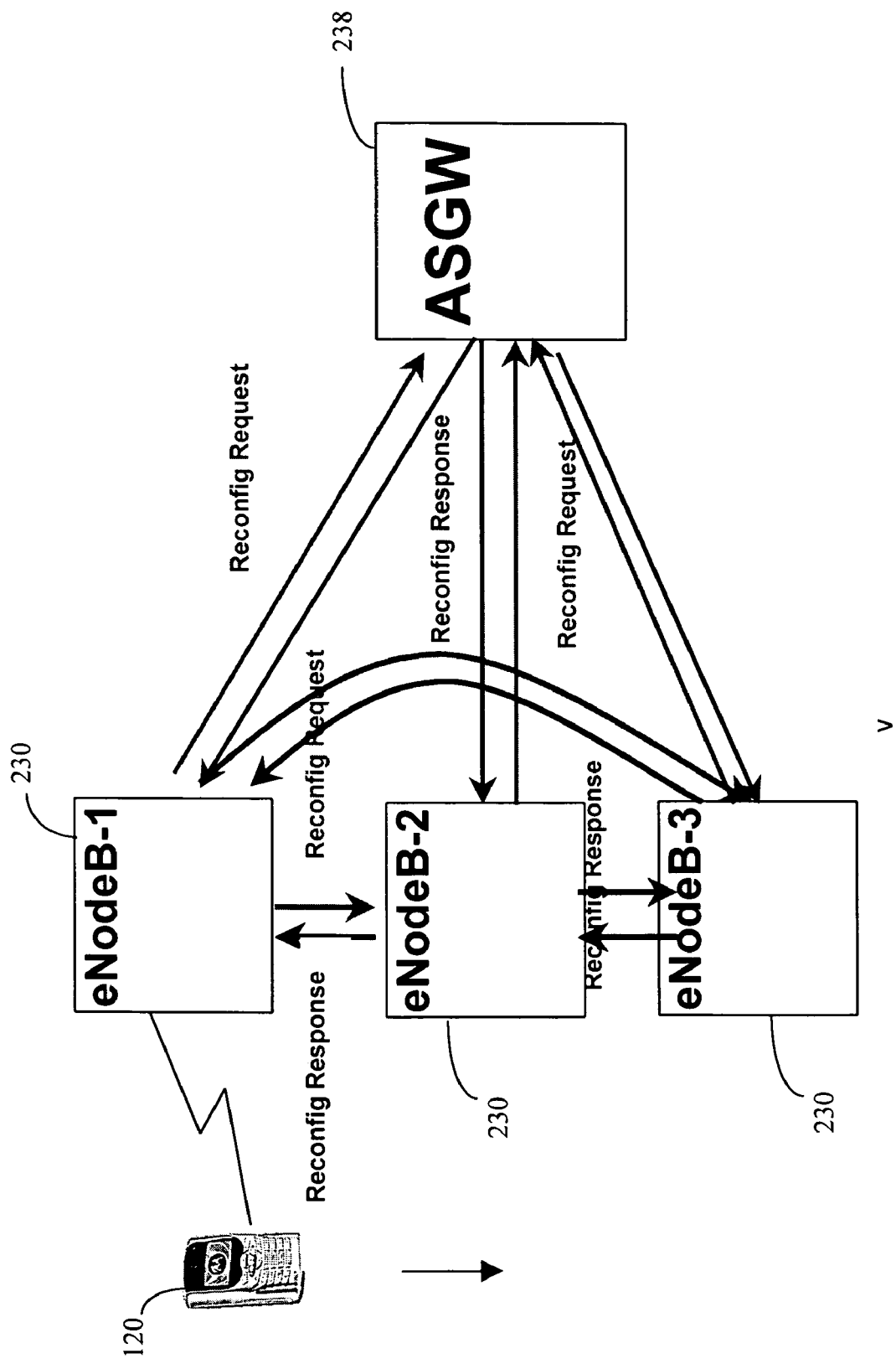

Generally, referring to FIG. 2B, each eNodeB 230 or ASGW 238 may initiate a reconfiguration request directed to any node (or multiple nodes) in response to determining that an RRM event has occurred. Each node receiving such a reconfiguration request will respond with an indication that such a reconfiguration is permitted or is not permitted. Thus, those skilled in the art will appreciate that using the one-to-many communication form may advantageously speed the process since all nodes involved in the configuration may be queried at about the same time.

Figure 3:
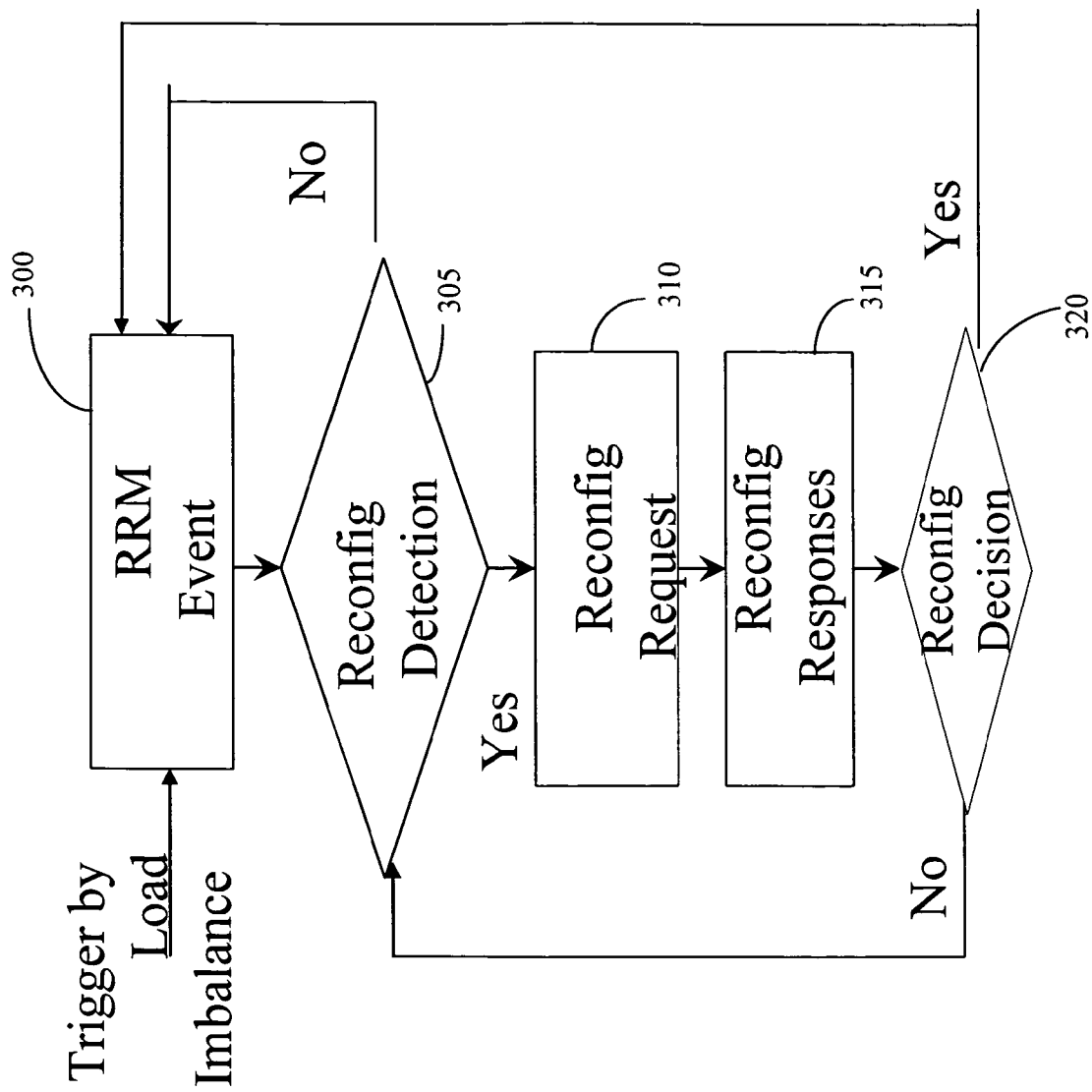
FIG. 3 is one embodiment of a flow chart representation of a method that may be used to coordinate radio resources.

Turning now to FIG. 3, a flowchart describing the process that the eNodeB 230 goes through in the event that an RRM event occurs is shown. At block 300 the eNodeB 230 determines that an RRM event has occurred and control is transferred to decision block 305. At decision block 305 a determination is made as to whether a reconfiguration is needed or can be performed. If not, control transfers back to block 300 and the process is reset, waiting for the next RRM event. If reconfiguration is warranted, control transfers to block 310 and the eNodeB 230 sends a reconfiguration request to the appropriate nodes. At block 315, the receiving nodes respond to the reconfiguration request, either accepting or denying the request. At block 320 a decision is made. If the responding nodes have accepted the reconfiguration request, then the reconfiguration occurs and control transfers back to block 300 and the process is reset. On the other hand, if at least one of the responding nodes has declined the reconfiguration request, then the reconfiguration does not occur and control transfers back to block 305 to determine if any other types of reconfiguration would be appropriate. If so, the process repeats with the new reconfiguration request. If not, control transfers back to block 300 and the process is reset.

It may be useful to consider an exemplary situation in which an RRM event occurs. Assume that Cell-1 desires to increase the cell edge load 20% because users moved from its neighboring cells (e.g., Cell-2 and Cell-3). The coordinated RRM in Cell-1 will trigger the radio channel resource redistribution request to Cell-2 and Cell-3 with the 20% load increase at the cell edge. Thus, Cell-2 and Cell-3 will respond, if possible, indicating that they will redistribute their radio channel resource for the use in the central portion of their cells to allow Cell-1 to serve more users in the cell edges.

Those skilled in the art will appreciate that the various system layers, routines, or modules illustrated in the various embodiments herein may be executable control units. The controllers may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for coordinating distributed radio resource management, comprising:
    detecting a degradation of an on-going interference mitigation scheme implemented by a plurality of radio resource management (RRM) units;
    sending, in response to detecting the degradation, a reconfiguration request that indicates a reconfiguration of the on-going interference mitigation scheme, wherein the reconfiguration request is sent to at least each of the RRM units affected by the reconfiguration of the on-going interference mitigation scheme;
    performing the reconfiguration of the on-going interference mitigation scheme in response to receiving a permission from each of the RRM units affected by the reconfiguration; and
    discarding the reconfiguration of the on-going interference mitigation scheme in response to receiving a refusal from at least one of the RRM units affected by the reconfiguration.

2. The method, as set forth in claim 1, wherein communicating information between the plurality of RRM units further comprises communicating information directly between the plurality of RRM units.

3. The method, as set forth in claim 1, wherein communicating information between the plurality of RRM units further comprises communicating information between a plurality of base stations having radio resource management responsibilities.

4. The method, as set forth in claim 1, wherein sending a reconfiguration request to at least each of the RRM units affected by reconfiguration further comprises sending the reconfiguration request in the form of a one-to-one communication.

5. The method, as set forth in claim 1, wherein sending a reconfiguration request to at least each of the RRM units affected by reconfiguration further comprises sending the reconfiguration request in the form of a one-to-many communication.

6. The method, as set forth in claim 1, wherein communicating information between the plurality of RRM units comprises communicating information related to radio resources associated with each unit, further comprising communicating information between the plurality of RRM units in response to determining that radio resource management event has occurred.

7. The method, as set forth in claim 6, wherein communicating information between the plurality of RRM units in response to determining that radio resource management event has occurred further comprises communicating information between the plurality of RRM units in response to determining that a handover from one RRM unit to another has occurred.

8. A method for coordinating distributed radio resource management, comprising:
    detecting a degradation of an on-going interference mitigation scheme implemented by a plurality of radio resource management (RRM) units;
    sending, in response to detecting the degradation, a reconfiguration request that indicates a reconfiguration of the on-going interference mitigation scheme, wherein the reconfiguration request is sent to at least each of the RRM units affected by the reconfiguration of the on-going interference mitigation scheme;
    performing the reconfiguration of the on-going interference mitigation scheme in response to receiving a permission from each of the RRM units affected by the reconfiguration; and
    discarding the reconfiguration of the on-going interference mitigation scheme in response to receiving a refusal from at least one of the RRM units affected by the reconfiguration, wherein communicating information between the plurality of RRM units comprises communicating information related to radio resources associated with each unit, further comprising communicating information between the plurality of RRM units in response to determining that radio resource management event has occurred, and wherein communicating information between the plurality of RRM units in response to determining that radio resource management event has occurred further comprises communicating information between the plurality of RRM units in response to determining that a load imbalance exists between the RRM units.

* * * * *